Nov. 7, 1961  G. S. DOMAN  3,007,654
ROTOR AND BLADE FOR ROTORCRAFT
Filed Dec. 27, 1956  2 Sheets-Sheet 1

INVENTOR.
Glidden S. Doman
BY
Bohleber, Fassett & Montstream
ATTORNEYS

Nov. 7, 1961  G. S. DOMAN  3,007,654
ROTOR AND BLADE FOR ROTORCRAFT
Filed Dec. 27, 1956  2 Sheets-Sheet 2
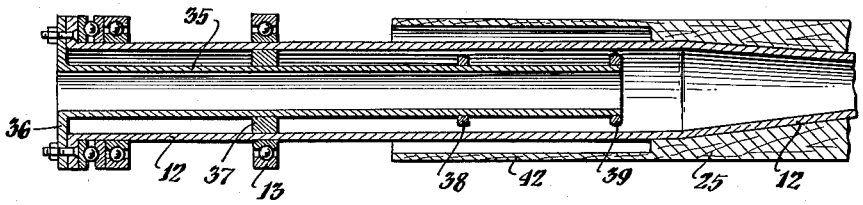
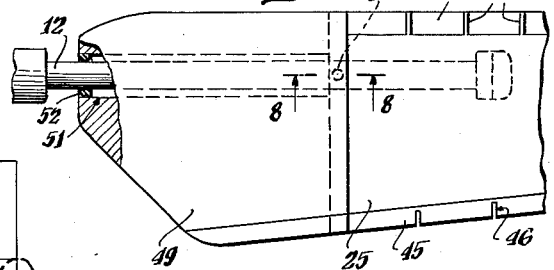
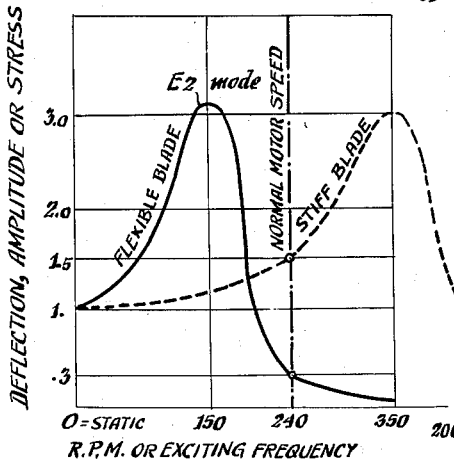
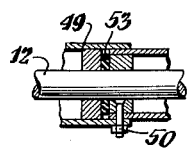
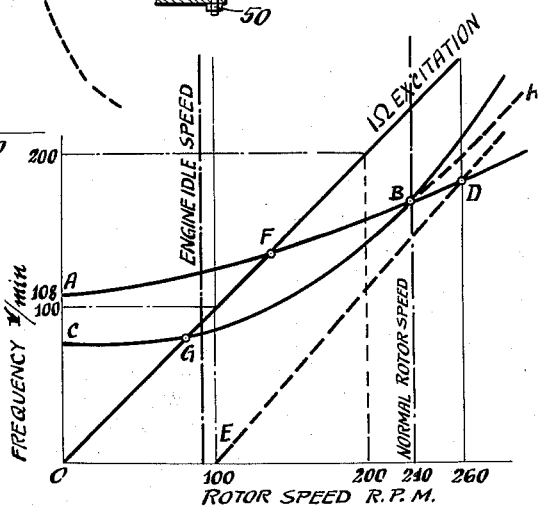
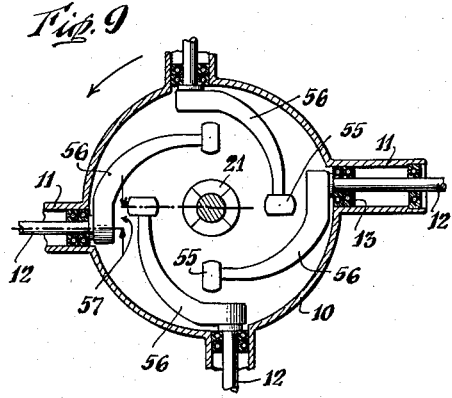
INVENTOR.
Glidden S. Doman
BY
Bohleber, Jassett & Montstream
ATTORNEYS

# United States Patent Office 3,007,654
Patented Nov. 7, 1961

3,007,654
ROTOR AND BLADE FOR ROTORCRAFT
Glidden S. Doman, Danbury, Conn., assignor to Doman Helicopters, Inc., Danbury, Conn., a corporation of Delaware
Filed Dec. 27, 1956, Ser. No. 630,999
41 Claims. (Cl. 244—17.11)

The invention relates to a helicopter or rotorcraft blade and also to a rotor which includes a rotor hub and the blades. Helicopter blades are subjected to vibratory loads which can be destructive if the blade is not properly constructed to reduce resultant stress effects. Heretofore if the primary structure of a blade failed, it was naturally thought that there was not sufficient strength in the failing part and the spar or other prime structure was strengthened such as by increasing the wall thickness of the spar. The invention herein provides a construction of blade and a combination of rotor head or hub and blades which reduces vibratory stresses which can and do cause failure. Reduction of the stresses may be secured by any one of the following by reducing the wall thickness of the spar, by selecting a spar of lighter thickness or cross sectional area, by giving it variable stiffness, by lengthening the spar or by combinations of two or more thereof. Important reductions of vibratory stress are also derived from a certain geometry of hub and pitch control mechanisms, which provides positive damping of a particular mode of vibratory blade bending.

Because weight is an important factor in helicopter construction, two and three bladed rotors are common construction. It has been forcefully urged that the addition of a fourth blade introduces an unreasonable weight penalty, however, a four-bladed rotor head results in the cancellation of certain vibratory forces and provides a high degree of smoothness in the aircraft. With the invention herein a four bladed rotor is lighter in weight than a rotor having three blades of prior types.

It is an object of the invention to construct a helicopter blade whose vibratory stress when flying at normal rotational speed is substantially reduced.

Another object of the invention is to construct a helicopter blade in which the stiffness of the spar increases upon increase in its amplitude of vibration or increases upon an increase in amplitude of vibration over a predetermined amplitude.

A still further object is to construct a helicopter rotor in which the blades are immovably fixed to the hub, that is without hinges, except for rotation on their longitudinal axes and carrying a form of blade to be described herein which substantially reduces the vibratory stress or stresses in the blades and hub.

Another object is to produce a rotor blade which is so much lighter than blades heretofore used that four may be used on a rotor without a weight penalty or three may be used with a weight advantage.

A still further object is to construct a blade with an elongated metal spar for flexibility without loss of aerodynamic area.

Another object is to construct a rotor having a stabilizing geometry or relation between an offset mounting for each blade upon the hub and the lever for changing the pitch of each blade.

A further object is to construct a rotor head of the floating type utilizing a drive shaft universal joint such that joint friction is of little or no effect with respect to blade vibration.

A still further object is to construct a blade for a self sustaining rotor which permits slenderizing thereof and thereby reducing aerodynamic solidity and improving efficiency.

Again another object is to construct a rotor head in which the drive shaft has a higher speed than rotor speed, and in addition a speed which is related to natural blade bending frequencies such that frictional forces in the universal joint do not set up vibrational disturbances in the blades and/or hub or minimize the same.

Other objects of the invention will be more apparent from the following description when taken in connection with the accompanying drawings illustrating preferred embodiments thereof in which:

FIGURE 4 is a longitudinal section of another blade or spar construction and also carries an aerodynamic extension;

FIGURE 5 is a graph of a comparison of the amplitude of responsive vibration of a blade herein with changes in frequency of the exciting force (in this case revolutions per minute at rotor speed) with a comparison of the characteristic of a stiff blade as heretofore used;

FIGURE 6 is a graph of the natural frequency characteristic or performance of a blade under varying speeds or revolutions per minute of the rotor;

FIGURE 7 is a modified form of inboard aerodynamic extension;

FIGURE 8 is a section taken on line 8—8 of FIGURE 7;

FIGURE 9 is an illustrative plan view of the pitch change levers or horns for the blades.

Figure 1:
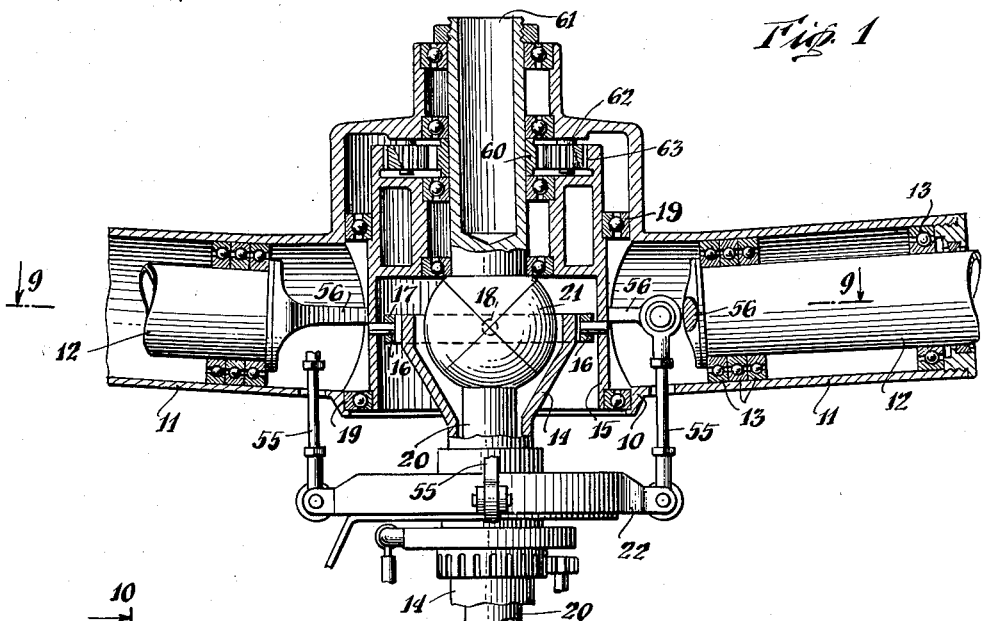
FIGURE 1 is a partial view and partially in section of a helicopter rotor showing the free floating head or casing.

Helicopter blades are subjected to considerable vibratory stress and any reduction thereof increases the life of the blades as well as substantially reduces the possibility of failure in flight. It is common practice to assume that if a certain design of blade fails or is short lived, that the blade structure was not strong enough and therefore its strength is increased in order to avoid future failure. The invention herein, however, reverses the usual procedure and reduces the strength as commonly conceived by producing a more limber or flexible blade of predetermined stiffness distribution with the result that vibratory stresses are substantially reduced at normal operating flight rotational speed and at speeds somewhat lower and higher than normal speeds with the result that the vibratory stress on the blade including the spar is greatly reduced. The life of the blade is greatly increased thereby and the possibility of failure or fracture is reduced substantially. The rotor blades preferably are mounted upon a rotor hub with a built in coning angle determined by average load and with a suitable built in drag angle. The rotor hub or casing with blades attached thereto is termed a rotor herein, while the hub, together with its support, drive and control mechanisms, is termed a rotor head.

The construction or constructions herein is applicable to the hinged type of blade and a rotor carrying such blades in which the blade is hingedly mounted to the hub with one pivot or two pivots at right angles to each other. The blade has greater utility or advantage with a fixed mounting of blade in the hub or casing, in combination with a free floating mount for the hub as described in application S.N. 679,695, Patent 2,648,387, in that such a hub does not burden the blades with the heavy loads of the Coriolis effect, and their other features may therefore be developed to greatest advantage. One of the results from the use of a limber spar on such blades and hubs is a self excited vibratory motion of the hub independently of the plane of rotation of the rotor. The construction herein provides means for automatic aerodynamic damping of such motions.

The preferred form of rotor includes a rotor head having a rotatable casing 10 having blade mounting sleeves or socket 11 in which the blades are suitably mounted for rotation or pitch change oscillation on the longitudinal axis of the blade as defined or determined by the axis of the blade spar 12. A swash or azimuth plate 22 secures said oscillation in known manner. The blades are otherwise immovably fixed to the rotatable casing. Suitable bearings 13 are provided for permitting rotation of each blade upon its axis. Preferably four blades are provided because the vibratory loads of important magnitude and frequency cancel out, and particularly the third harmonic and lesser frequencies. The rotor hub preferably is of the free floating type in that it is subject to no restraints against tilting in normal operation and may move freely within its range of movement under the aerodynamic forces acting thereon. This type of head includes a mast or pylon 14 which is fixed to the fuselage of the aircraft and carries a bearing member or shell 15 which is mounted thereon by a suitable gimbal or universal joint provided by the pivots 16, ring 17 and pivots 18 between the ring 17 and pylon 14. The casing 10 is rotatably mounted on the bearing member upon the bearings 19. The drive shaft 20 carries a universal joint 21 in alignment with or on a common center with the universal joint for the bearing member 15.

The blade includes the aerodynamic portion and the metallic spar 12 which is attached to the aerodynamic portion at the inboard end thereof and projects therefrom. Any method or means of attachment may be used, that shown being a flattening of the outer end of the tubular spar and this end being anchored to the aerodynamic portion by bolts 26. This spar has a flexibility or limberness such that the ratio of the rotor revolutions per minute, which is the exciting frequency, to the natural frequency of the blade in its edgewise second mode of bending, which is a cantilever bending in the plane of rotation, at operating rotor r.p.m. (revolutions per minute) is at least 1.3. It may also be expressed in its inverse ratio as not exceeding .77. For the blade whose amplitude versus frequency response is plotted in FIGURE 5, this ratio is 1.6 and the 1.3 ratio specified is a minimum in which vibratory stress is unity relatively and is close to an essential minimum. At a ratio below 1.3 it becomes difficult to secure smooth flight. In making a limber or flexible blade consideration must be given to the well known phenomenon of ground instability or "ground resonance" as will appear more fully hereinafter.

The significance and importance of this relationship of natural frequency to exciting frequency in blade operation is illustrated by reference to the curves of FIGURE 5 on which the amplitude of vibration of a blade constructed in accordance with the invention, is plotted as shown in the solid line, against the frequency of excitation which is synonymous with rotor speed and its harmonics at, and only at, operating rotor speed. The dashed line shows a comparable plot or curve of the amplitude of vibration of a so-called stiff blade as heretofore manufactured and used against exciting frequency. The response or amplitude of vibration curve of the blade of the invention starts at unity at zero frequency and reaches a resonance peak at about 150 cycles per minute and thereafter the amplitude of vibration drops off rapidly to a value of less than 1 so that at a normal rotor speed of 240 r.p.m., where r.p.m. and exciting frequency are synonymous, the vibrational stress or force, as represented by the amplitude of vibration, is about $3/10$ or 30% of that produced by one unit of force applied statically or at zero r.p.m. This is for an $E_2$ mode of vibration which will be described hereinafter. If now the rotor speed is increased the vibrational stresses further decrease, and the vibrational stresses do not increase materially for a considerably lower speed than normal rotor speed. For example, the stress or deflection is unity at a speed of about 200 r.p.m. which is well below operating speed.

The dashed line shows the response or vibration characteristics of a so-called stiff blade heretofore used in which the resonance peak is at about 350 r.p.m. with the result that at normal rotor speed of 240, the blade is subjected to vibrational stresses or amplitudes of 1.5 relative to the force which produces unit deflection when stationary, that is, vibrational stress of 150 percent of unit stress as compared to a limber blade 30 percent vibrational stress. Increase in the rotor speed also results in a rapid increase in the stress and amplitude of vibration. The curves of this chart are prepared on the basis of one unit of force whatever it may be, applied statically or at zero r.p.m., produces one unit of amplitude of deflection so that by measuring this amplitude response factor at different speeds, an accurate measure of relative vibratory forces to which the blade is subjected is secured.

Not only are the secondary edgewise mode blade vibrations potentially destructive, but if the natural frequency of the other and more complex modes of vibration should be in the neighborhood of rotor r.p.m. or a multiple thereof, then destructive vibrations will be set up or at least vibrations which materially increase roughness and instability in the behavior of the rotor. Rotor r.p.m. or any multiple thereof comprise the exciting frequencies. It is not enough, therefore, to merely make a limber or flexible blade, but the blade must be initially constructed, or constructed and thereafter altered to have natural frequencies in both edgewise and flatwise modes so that the higher modes or higher natural frequencies are well and properly spaced from all exciting frequencies when it is turning at normal speed. The exception is that the flatwise second mode may be and for optimum results should be the same as the rotational speed, if it can be achieved, but not the same as the speed of the universal joint. Frequencies of higher modes should be properly located, that is spaced from multiples of the exciting frequencies or rotor r.p.m.

The blade described is suitable for use irrespective of the number of blades to be used for the rotor and hence constitutes what may be termed a general utility blade. When the number of blades to be used on the rotor is known there may be some relaxation of the above recited limitations as will be discussed hereinafter. The speed of the universal joint 21 for the drive shaft 20 is also a factor which will be discussed more fully hereinafter.

In designing, testing and/or modifying a blade for its natural frequencies, consideration must be given also to the fact that the natural frequencies of the blade increase with the speed of rotation of the blade or rotor. In other words, the mass of the blade and spar are subjected to centrifugal force when the rotor is rotating which force increases as the blade or rotor speed increases. This has the effect of stiffening the spar and blade and, therefore, increasing the natural frequency of the blade in secondary modes as well as the higher frequencies or modes. This is illustrated by the following table in which the E designations are edgewise frequencies or modes and the F designations are flatwise frequencies or modes. The $E_1$ designation is a mode of vibration in which the blade and spar are straight as in a pinned or hinged mounting but vibrates across the plane of rotation of the rotor. The $E_2$ mode is a bending as in a fixed mounting, the major part of the bending being in the spar because of the much greater rigidity of the aerodynamic portion in the edgewise direction, and the $E_3$ mode is a vibration such as produced in a hinge mounted blade in which the inboard portion of the blade is on one side of a radius of the disk, and the outboard portion assumes a curve with the tip of the blade crossing the radius, producing a node near the tip. The important F modes are the same with the addition of an $F_4$ mode for a fixed blade which produces a vibration with the spar bending away from the plane of revolution and the aerodynamic portion having a reverse bend which brings the tip back toward or across the plane of revolution, producing two outboard nodes.

In general, the natural frequencies of the blade at operating r.p.m. should be such for optimum performance that none of them coincide or approximately coincide with the exciting frequencies. For example, with a rotor or blade speed of 240 r.p.m., the second harmonic or multiple thereof is 480 which must be properly avoided for maximum results. For the higher natural frequencies or modes, the ratios specified for the second mode may be deviated from.

| Cycles per minute | |
| --- | --- |
| Non-rotating | Rotating, 240 r.p.m. |
| $E_1$—0 | $E_1$—0 |
| $E_2$—108 | $E_2$—150 |
| $E_3$—550 | $E_3$—800 |
| $F_1$—0 | $F_1$—240 |
| $F_2$—70 | $F_2$—300 |
| $F_3$—175 | $F_3$—600 |
| $F_4$—275 | $F_4$—770 |

For maximum overall stress suppression to be achieved by the limber or flexible blade irrespective of the number of blades to be carried by the rotor, the blade should be constructed so that the natural frequencies of vibration of the blade do not fall at any exciting frequency or adjacent thereto, with due consideration given to the increase of the respective natural frequencies when the rotor is rotating and subjecting the blades or spars to centrifugal force. For example, the natural frequency of the $E_2$ mode when the rotor is turning at normal speed would be 150 cycles per minute which is well spaced from the exciting frequency of 240. Similarly, the natural frequency of the $E_3$ mode at normal speed is 800 cycles per minute, and is favorably spaced from the third multiple or harmonic of rotor speed which is 720 as well as from the fourth multiple which is 960, the frequency ratio being respectively 1.11 and 1.2 which is quite favorable. At this higher harmonic of the exciting frequency, a lower ratio than 1.3 can be tolerated.

A blade constructed with the low natural frequencies discussed above, results in a substantial reduction in the vibratory blade stress in flight. This construction of blade, however, produces a self-excited unstable vibration commonly called ground resonance which, however, is an instability rather than a resonance. The ground resonance is also dependent upon the landing gear stiffness, fuselage mass distribution and rotor speed, it having been observed that when the rotor speed equals the sum of the natural frequency of the blade $E_2$ mode, and the natural frequency of the fuselage, that this ground instability occurs and the fuselage vibrates with considerable amplitude. It is for this reason that a so-called variable stiffness construction of blade is utilized or added to the construction of a flexible blade or spar such that when the amplitude of vibration of the blade increases beyond a predetermined amount, the blade stiffness increases. Although the variable stiffness construction may affect other of the modes discussed herein, it finds its greater usefulness in connection with the $E_2$ mode of vibration, and control of ground instability.

Another approach which requires a different construction as will be described more fully hereinafter involves controlling the shape and slope of the curve of $E_2$ natural frequency plotted against rotational speed. This construction alters the curve over its entire length, rather than causing it to be diverted by growing amplitude as is the case with the variable stiffness construction.

Figure 2:
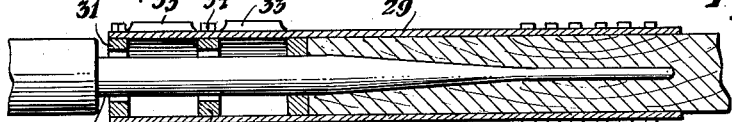
FIGURE 2 is a partial longitudinal section through a part of a blade showing the spar with stiffening means.
Figure 3:
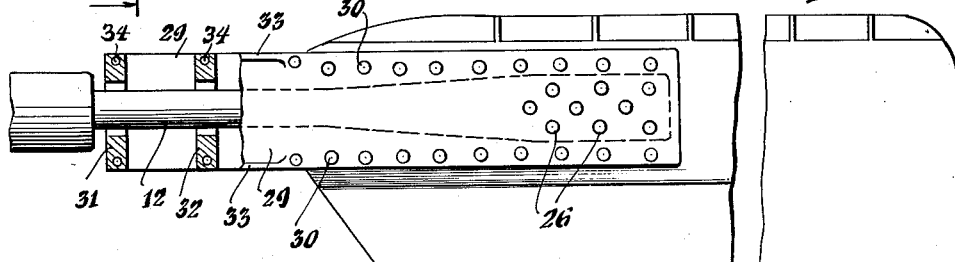
FIGURE 3 is a plan view of the inboard end of a blade.
Figure 10:
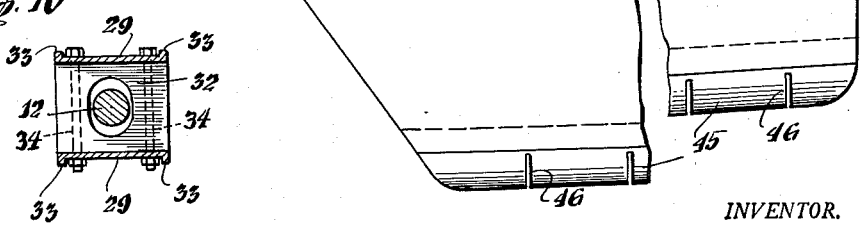
FIGURE 10 is a section taken on line 10—10 of FIGURE 2.

Two forms of variable or amplitude-controlled stiffness means are shown as illustrative of several forms which are available. That of FIGURES 2 and 3 is an external construction, particularly attached to the inboard end of the aerodynamic portion of the blade, and FIGURE 4 illustrates particularly an internal form secured to the inboard end of the spar which two forms clearly indicate that the results and operation are the same and the constructions essentially alike irrespective of whether it is external or internal of the spar and irrespective of at which end of the spar it is mounted or secured. It may even be carried by the casing or head and the contact rings rotatably mounted to provide for the relative movement or oscillation of the blade.

The variable stiffness means particularly shown in FIGURES 2 and 3 uses a pair of plates 29 about ⅛ of an inch thick for a forty foot rotor anchored to the inboard end of the aerodynamic portion of the blade such as by bolts 30. These plates extend over the metallic spar 12 but are spaced therefrom. A ring or block 31 may be secured to the plates or to the spar, the former being illustrated and spaced from the other part. A second ring or block 32 may also be provided spaced from the ring 31. In the construction shown the rings are carried by the plates and do not touch the spar. Two such rings should be sufficient. The opening in the ring for the spar is sufficiently great in vertical direction so that flatwise vibrations do not engage the ring or rings. During normal amplitudes of vibration of the blade, the blade vibrates at its normal amplitude without the spar stiffening means coming into operation. Should the amplitude of vibration increase, then the ring 31 comes into contact with the spar so that the stiffness of the spar now has added to it the stiffness of the plates. The result is that at increased amplitudes of vibration of the blade the stiffness thereof is increased which increases its natural frequency so that the point of ground instability is raised. Should the vibrations continue to increase in amplitude, then the flexure of the plates would bring the second ring 32 into contact with the spar and thereby further increase its stiffness. The structural stability of the plates may be increased by providing flanges 33 between the rings.

The blade or spar 12 of FIGURE 4 has an internal stiffening means which includes a tubular support 35 secured by the spar in any desired fashion, that shown including a flange 36 secured to the spar flange and a supporting ring 37 located at the outboard bearing 13. The tubular support carries one or more spaced rings 38 and 39 shaped to engage the spar in edgewise vibration only. This increased stiffening means operates in the same manner as the construction of FIGURES 2 and 3 and need not be described.

The above effect is illustrated in the graph of FIGURE 6 where the natural frequency of the blade is plotted against rotor speed. In the curve AFBD the natural $E_2$ frequency characteristic of a limber blade is shown. If now the rotor speed should be increased to 260 r.p.m. the natural frequency curve would intersect the line ED at point D which line represents the center of fuselage instability in the case of a fuselage having a natural frequency on its undercarriage of 100 cycles per minute. At this speed, ground instability would then be great. With the plates or other amplitude-controlled stiffening means, the natural frequency curve characteristic of the blade follows the line AFBH so that the center of ground instability, its intersection with the ground instability line or curve ED is not reached at any expected rotor speed above normal operating speed. It is clear that the rings may be relatively soft rubber or the like and also may contact the spar so that the increased stiffness is applied gradually to the spar through the resiliency of the rubber ring.

The graph illustrates also that with a blade having a natural frequency characteristic as represented by the curve AFBD there is also a condition of importance at the point F which is the true $E_2$ resonance peak illustrated in FIGURE 5. By increasing the flexibility of the metallic spar and moving the center of flexure outwardly so that its natural frequency curve is that of curve CGB, this point of resonance is brought to G which is below rotor speed at engine idling speed. This change of curve shape is accomplished usually by increasing the section modulus of the spar which stiffens it, and at the same time increasing its exposed and unsupported length which brings the overall blade flexibility at zero rotational speed to a much lower figure than that of the blade which followed curve AFBD. At the same time, these changes of construction increase the stiffening effect of centrifugal force, because they move the center of flexure outwardly along the blade, which in effect, decreases the centrifugal pendular length. A blade of this construction has a long exposed shank and has lost some available aerodynamic surface unless it has the non-stiffening aerodynamic extension of the present invention. By providing the natural frequency curve shape CGB, this construction completely eliminates the ground resonance phenomenon because line ED cannot be intersected at any rotor speed. Notwithstanding the above advantage of effective stiffness with respect to ground instability, the blade will have a ratio of $E_2$ frequency to r.p.m. which in flight, will minimize vibratory stresses.

FIGURE 4 illustrates a blade in which the metallic spar has been lengthened for the above reasons. To accomplish this curve shape CGB by altering spar design will, in a typical case, mean lengthening it from about a two foot length to about 5½ feet of unsupported length. In order to avoid the loss of aerodynamic area, the aerodynamic portion 42 is extended inwardly with ample clearance around the spar 12 so that the latter may flex freely without interference from the inwardly extended aerodynamic portion. No lift area is lost therefore by lengthening the spar. The same result may be secured by the form shown in FIGURE 7.

The discussion above is directed principally to the $E_2$ mode of vibration which relates primarily to the metallic spar 12. It is essential too that the $E_3$ mode have a natural frequency which is not coincident with certain harmonics of the rotor exciting frequency of r.p.m. and it has been found that even the fourth harmonic of exciting frequency can be troublesome. Control or adjustment of the natural frequency of the $E_3$ mode is secured by constructing the aerodynamic portion of the blade so that it will have a natural frequency slightly in excess of the low value which is desired. This includes a trailing edge tab 45, which initially is continuous, securely attached to the trailing edge such as by being sandwiched into the trailing edge of the blade. This trailing edge serves three purposes namely, an aerodynamically clean and durable trailing edge, a member which may be bent upwardly and/or downwardly along its length to adjust for aerodynamic pitching moment and for altering blade stiffness and the natural frequency in the $E_3$ mode. By cutting slots 46 at spaced intervals, the flexibility of the aerodynamic portion is increased and hence lowers the natural frequency thereof.

The blade may also carry a continuous and suitably bonded leading edge facing 47, which is nailed and cemented if metal and cemented only if nylon, which in addition to affording abrasion resistance, is slotted at 48 about six inches apart after assembly to reduce stiffness to the desired natural frequency in the same manner as described for the trailing edge tab. If increased flexibility or reduced natural frequency is desired, then additional slots are cut. The blade so constructed is given, or tuned to, a natural frequency in the $E_3$ mode which avoids troublesome or destructive vibrations, and matches the blades in this respect.

Another form of construction is shown in FIGURE 7 for extending inwardly or adding an inboard overhanging aerodynamic extension 49. This section is pivotally secured to the aerodynamic portion 25 by a universal pivot such as afforded by a bolt 50 at one edge and a flexible pad 53 between the blade sections. The extension has an enlarged bore or cavity 51 for free and unrestrained flexing of the metallic spar 12. A rubber supporting ring 52 secured adjacent or at the inboard end of the extension engages the spar for additional support. It affects flexing of the spar, but little, if at all. This extension is aerodynamically constructed and formed so that additional lift is provided in the region otherwise filled by the long metallic blade spar 12.

The pitch of each blade of a rotor is controlled by a push rod 55 connected with the swash plate 22 which push rod oscillates the blade in the pitch change bearings 13 through the levers or horns 56. The blade pitch change axes are offset forwardly with respect to direction of rotation by an amount 57, referred to hereinbefore as a "built in drag angle." For a jet driven rotor with the jet motor at or adjacent the blade tips or for an autogiro rotor designed primarily for autorotation, the blade spar is offset rearwardly with respect to the direction of rotation from a radial from the center of rotation of the rotor and for these rotors the pitch change horn or lever extends forwardly. In other words the pitch change horn for each blade extends in a direction which is opposite to the direction or location or position of the axis of the offset of the blade spar with respect to a radial through the center or axis of the rotor head. With this direction of extension of the horn, it has a ratio of length with respect to the ratio of length of horn for a blade which is not offset of greater than one. A horn extending in the same direction would have a ratio of length of less than one. This offset is provided here for three additional reasons. First, this forward offset in combination with a rearward positioning of the control lever 56, acts to provide aerodynamic damping for an otherwise self exciting bending of the blades in the vertical plane, in what is described hereinbefore as the flatwise mode three ($F_3$) bending vibration. Secondly, this combination of offset and lever positions increases the period of the pendular flight path instability of the whole aircraft, and a lengthening of the period by three times at least has resulted, thus making it easier for the pilot to control the ship. Thirdly, with an arm ratio of length greater than one, when the rotor tilts such as from a gust the plane of rotation of the rotor with respect to the swash plate changes which in turn causes a change in the pitch of the blade with respect to the swash plate. With a horn having a ratio of length greater than one, the pitch change is less than when the horn extends in the same direction and the ratio of length is less than one. When the horn extends in the same direction as the offset or is on the same side as the offset, a ruffle of the tip plane path is developed in the blades which causes serious instability and renders the helicopter unmanageable.

The combination of floating hub, flexible blade, forward offset and backward blade pitch levers or horns, secures the maximum of stress suppression, dynamic stability, flight path stability and steadiness of rotor behavior.

The frictional forces in the universal joint also will and do set up vibrational stresses in the hub and blades. They constitute in fact another exciting frequency. These joint friction forces are minimized if the drive shaft 20 and the universal joint 21 are rotating at a speed which differs from the natural frequency of $F_2$ or $F_4$ mode of blade bending. It has been found that avoiding the natural frequencies of these modes is enough to remedy vibrational response to the universal joint or reduce it to a sufficient degree. The shaft speed ratio for maximum reduction of vibrational stress is usually a fractional speed ratio, and 1 to 3.5 has been used which for a rotor speed of 240 r.p.m. is a drive shaft speed of 840 which avoids a multiple of rotor speed and is well above the frequency of the F₄ mode. For optimum results so far as minimizing vibrational response is concerned the drive shaft, and the joint therefor, should exceed a speed in r.p.m. corresponding to 1.3 times the frequency of $F_4$ mode of vibration.

The construction of rotor head using a planetary gear system shown in application S.N. 679,695 is suitable for securing the relative speed ratio discussed and includes a gear 60 secured to or carried by a stub shaft 61 which meshes with planetary gears 62 carried on shafts 63 which are mounted on the hub 10. The planetary gears mesh in turn with a ring gear 63 carried by the shell 15.

The conditions set forth hereinbefore in constructing a flexible blade or modifying a blade to give one which avoids destructive or troublesome vibration or vibrational stress are given without detail consideration of the number of blades carried by the rotor. Proper location of the higher mode natural frequencies is a function of the number of blades to be carried by the rotor and of the type of fixity or mounting used that is, cantilevered, pinned, see-sawed, etc. If the number of blades to be used on the rotor is known it is not necessary to avoid natural blade frequencies of all multiples of the rotor speed. For example, with a four bladed rotor the natural blade frequency of the tertiary edgewise or $E_3$ mode need not avoid a frequency of three times or two times rotor speed. For a three bladed rotor this edgewise three mode natural blade frequency must avoid a frequency which is three times rotor speed, and for a two bladed rotor the $E_3$ mode natural blade frequency must avoid a frequency of two times rotor speed. Thus for edgewise mode 3 and mode 5 motion the "pertinent" rotor speed multiples to be avoided in selecting blade stiffness are a progression of multiples such as 4, 8, 12, etc. for four blades, 3, 6, 9, etc. for three blades, 2, 4, 6, etc. for two blades, and 1, 2 3 4 etc. for one blade. When the number of blades in the rotor is sufficient and is known greater latitude exists in selecting a natural frequency of the blade in the edgewise 3 mode of vibration. The "pertinent" exciting frequencies for an odd-numbered, higher natural frequency edgewise mode vibration of a blade and which must be avoided, are the multiples of rotating speed which are the product of speed and the number of blades on the rotor. Frequencies of other multiples of rotor speed need not be avoided in these modes. Similar rules apply to other mode types namely flatwise, even, etc.

The blade spar should have an axial strength sufficient to withstand the centrifugal load placed thereon when the blade is rotated on a rotor. Usual value used with a proper safety factor is a minimum of twice the centrifugal load.

The flexible blade and rotor described is applicable to the main sustaining rotor and to control and tail rotors as well and in fact to any blade which is subject to vibrational stress.

The natural frequency of vibration or flexibility of a blade is a function of the dimensions, mass and the material or materials of which it is made. If a designer should wish to calculate the approximate spar dimensions, the time of vibration of a flexible element which is fixed at one end and loaded at the other, ignoring its own weight, is given in Kent's Handbook, 10th edition (1923), page 1555, as $$\text{time in seconds} = \sqrt{\frac{f}{g}}$$

where $f$ is deflection and $g$ is acceleration due to gravity or 32.2. Frequency is the inverse of time. Deflection is given on page 352 of Kent and in Boyd Strength of Materials, second edition (1917), on page 138, as $$= \frac{Pl^3}{3EI}$$

where P is the load, $l$ is the length, E is the modulus of elasticity of the material, and I is the moment of inertia of the spar or beam used. E is different for all materials. Boyd also gives the formula on page 356 for moment of inertia I for a hollow cylinder such as the spar illustrated of radius $r$ and wall thickness $dr$, $I = 2\pi p l r^3 (dr)$ where $l$ is the length and $p$ is the mass per unit volume. Kent on page 550 gives the formula for a hollow cylinder of $I = \frac{1}{8} W(D^2 \times D_2)$ where $W$ = weight and D is the external diameter and $D_2$ is the internal diameter. The formula for I will be different dependent on the cross section or shape of the spar. Change of any one or more of the factors of dimension, modulus of elasticity or the material, load or mass, and moment of inertia will change the frequency. The blade is so constructed that it will have a flexibility or natural frequency of vibration as set forth herein. Any suitable means may be used to retain the inner end of the spar within the bearings on the rotor head. The means particularly shown in FIG. 4 is a flange on the inner end of the spar or the other end from the end to which the aerodynamic portion is secured. Preferably the spar is the sole means for securing the blade to the rotor head.

This application is a continuation in part of application S.N. 182,861, filed September 1, 1950, now abandoned.

This invention is presented to fill a need for improvements in a Rotor and Blade for Rotorcraft. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A blade for a rotor for a rotorcraft to be mounted upon a fuselage with landing gear and adapted to be rotated at approximately a predetermined speed for normal flight which constitutes an exciting frequency comprising an aerodynamic portion, a spar attached at one end to the aerodynamic portion and projecting therefrom, the spar carrying the major portion of the bending stress of the blade, the spar and aerodynamic portion being constructed with dimensions, mass and material to have a flexibility such that the ratio of exciting frequency in operating revolutions per minute to the natural edgewise mode two frequency of the blade at operating revolutions per minute is approximately 1.3 or greater whereby the natural resonance frequency is below the exciting frequency, and the spar having an axial strength greater than the maximum centrifugal force to which it is subjected in flight.

2. A blade as in claim 1 in which the natural frequency of the blade in a higher edgewise mode and at operating revolutions per minute is spaced from the exciting frequency at operating speed of the blade in revolutions per minute and any multiple thereof when mounted on a rotor head.

3. A blade as in claim 1 in which the natural frequency of the blade in flatwise mode two type of vibration at the operating speed of the blade in revolutions per minute when rotated is spaced from the second multiple of the exciting frequency.

4. A blade as in claim 1 in which the natural frequencies of the blade in flatwise modes higher than mode 2 at the operating speed of the blade in revolutions per minute when rotated are speced from the exciting frequency at operating speed of the blade in revolutions per minute and any multiple thereof when mounted on a rotor head.

5. A blade as in claim 1 in which the natural frequencies of the blade in edgewise mode and flatwise mode is such that they are spaced from the exciting frequencies including operating speed of the blade in revolutions per minute when rotated and any multiple thereof.

6. A blade as in claim 1 in which the blade has a natural frequency of the mode two type in excess of the difference between rotor speed in revolutions per minute and the natural frequency of the fuselage on its landing gear.

7. A blade as in claim 1 in which the blade has natural frequencies in the edgewise modes higher than mode 2 flatwise modes higher than mode 2 and at rotor speed in revolutions per minute such that they are spaced from the exciting frequency of the rotor speed in revolutions per minute and any multiple thereof and such that the natural frequency of the edgewise mode two type is in excess of the difference between rotor speed and the natural frequency of the fuselage on its landing gear.

8. A blade as in claim 1 including stiffening means secured at one end to the blade where relatively fixed with respect to the spar and being the sole connection therefore and having an unsupported portion extending to a point of spar bending and spaced from the spar during normal deflection and engaging the spar upon a predetermined increase in amplitude of deflection of the spar to increase the spar stiffness.

9. A blade as in claim 1 including stiffening means fixedly secured at one end thereof to the blade where relatively fixed with respect to the spar and having an unsupported portion extending over the projecting portion of the spar, the means having resiliency and being spaced from the spar throughout the unsecured portion for normal deflection of the spar and engaging the spar at least at one point in the unsecured length of the stiffening means and at least in the edgewise plane to increase the stiffness of the spar upon a predetermined increase in amplitude of deflection of the spar.

10. A blade as in claim 1 including stiffening means including at least one plate fixedly secured to the blade solely at one end of the stiffening means and having an unsupported portion extending over the projecting portion of the spar in the plane of the aerodynamic portion, the stiffening means having flanges extending in the direction of the spar, and at least one collar carried by the stiffening means surrounding the spar at the center portion thereof and spaced therefrom for normal amplitudes of deflection and engaging the extending portion of the spar upon a predetermined increase in the amplitude of the bending of the spar in edgewise direction with respect to the aerodynamic portion.

11. A blade as in claim 1 including a spar of substantial unsupported length, and an aerodynamic extended portion having an aerodynamic form extending inwardly over the spar and attached solely to the aerodynamic portion and having clearance around the spar throughout its length to permit unrestrained bending of the spar.

12. A blade as in claim 1 including a spar of substantial unsupported length and an aerodynamic extended portion having an aerodynamic form extending inwardly over the spar and integral with and attached solely to the aerodynamic portion of the blade, the aerodynamic extended portion having clearance around the spar throughout its length to permit unrestrained bending of the spar.

13. A blade as in claim 1 including an aerodynamic extended portion having an aerodynamic form and having a floating connection at one end to the aerodynamic portion of the blade and movable therewith and means at the other end of the aerodynamic extended portion engaging the spar adjacent the inner end of the latter, and the aerodynamic portion having clearance between the aerodynamic extended portion and the spar between said last aforesaid means and the aerodynamic portion.

14. A blade as in claim 1 including an abrasion strip secured to the leading edge of the aerodynamic portion, and the abrasion strip having at least one slot therein to increase the flexibility of the aerodynamic portion.

15. A blade as in claim 1 including a tab secured to the trailing edge of the aerodynamic portion, the tab having at least one slot therein to increase the flexibility thereof, and an abrasion strip secured to the leading edge of the aerodynamic portion and having at least one slot therein to increase the flexibility thereof.

16. A helicopter rotor to be mounted upon a fuselage with landing gear and adapted to be rotated at approximately a predetermined speed for normal flight which constitutes an exciting frequency comprising a universal joint having unrestricted and free floating movement, a shell carried by the universal joint, a casing rotatably mounted upon the shell, a plurality of blades, means mounting each blade upon the casing for rotation on its longitudinal axis and fixed thereto with respect to other directions of movement, each blade including an aerodynamic portion and a spar attached at one end to the aerodynamic portion and projecting therefrom, the spar and aerodynamic portion being constructed with dimensions, mass and material to have a flexibility such that the ratio of exciting frequency at operating revolutions per minute and the fundamental natural edgewise frequency of the blade including the spar at operating revolutions per minute, is approximately 1.3 or greater whereby the natural resonance frequency is below the exciting frequency, and the spar having an axial strength greater than the maximum centrifugal force to which it is subjected in flight.

17. A helicopter rotor as in claim 16 in which the natural frequency of the blade is a higher edgewise mode and at operating revolutions per minute is spaced from the operating speed of the blade in revolutions per minute and any multiple thereof when mounted on a rotor head.

18. A helicopter rotor as in claim 16 in which the natural frequency of the blade in flatwise mode two type of vibration at the operating speed of the blade in revolutions per minute when rotated is spaced from the second multiple of the exciting frequency.

19. A helicopter rotor as in claim 16 in which the natural frequencies of the blade in higher flatwise modes at the operating speed of the blade in revolutions per minute when rotated are spaced from the exciting frequency and any multiple thereof when mounted on a rotor head.

20. A helicopter rotor as in claim 16 in which the natural frequencies of the blade in flatwise and edgewise mode are such that they are spaced from the exciting frequency at operating speed of the blade in revolutions per minute when rotated and any multiple thereof.

21. A helicopter rotor as in claim 16 in which the blade has a natural frequency of the mode two type in excess of the difference between rotor speed in revolutions per minute and the natural frequency of the fuselage on its landing gear.

22. A helicopter rotor as in claim 16 in which the blade has natural frequencies in the higher edgewise mode and higher flatwise modes and at rotor speed in revolutions per minute such that they are spaced from the exciting frequency of the rotor speed in revolutions per minute and any multiple thereof and such that the natural frequency of the edgewise mode two type is in excess of the difference between rotor speed and the natural frequency of the fuselage on its landing gear.

23. A helicopter rotor as in claim 16 including stiffening means secured solely at one end to the rotor and having an unsecured portion spaced from the spar during normal vibration and engaging the spar upon a predetermined increase in the amplitude of vibration of the spar to increase the spar stiffness.

24. A helicopter rotor as in claim 16 including means fixedly secured to the blade and solely at one end and having an unsupported portion extending over the projecting end of the spar, the unsupported portion being spaced from the spar throughout its length for normal deflection of the spar, the means having resiliency and engaging the spar at least at one point in the length thereof and at least in the edgewise plane to increase the stiffness of the spar upon a predetermined increase in the amplitude of deflection of the spar.

25. A helicopter rotor as in claim 16 including means fixedly secured solely at one end to the spar and having an unsupported portion extending over the projecting end thereof, the unsupported portion of the means being spaced from the spar throughout its length for normal vibration of the spar, the means having flanges extending in the direction of the spar, and at least one collar carried by the means surrounding the spar and spaced from the spar for normal vibration of the spar and engaging the extending portion of the spar upon a predetermined increase in the amplitude of vibration of the spar.

26. A helicopter rotor as in claim 16 including a spar of substantial unsupported length, and an aerodynamic extended portion attached solely at one end to the aerodynamic portion and extending inwardly thereover and having clearance around the bendable portion of the spar to permit unrestrained bending thereof.

27. A helicopter rotor as in claim 16 including a spar of substantial unsupported length, and an aerodynamic extended portion extending inwardly thereover and integral with the aerodynamic portion of the blade and having clearance around the spar throughout its length to permit unrestrained bending of the spar.

28. A helicopter rotor as in claim 16 including an aerodynamic extended portion floatingly connected at one end with the aerodynamic portion of the blade and movable therewith and means at the other end supported on the spar adjacent its end remote from the aerodynamic portion and having clearance around the spar between its ends to permit unrestrained bending of the spar.

29. A helicopter rotor as in claim 16 including a tab in the trailing edge of the aerodynamic portion, and the tab having at least one spaced slot therein to increase the flexibility of the aerodynamic portion to the desired natural frequency.

30. A helicopter rotor as in claim 16 including an abrasion strip secured to the leading edge of the aerodynamic portion, and the abrasion strip having at least one laterally extending slot therein to increase the flexibility of the aerodynamic portion.

31. A helicopter rotor as in claim 16 including a tab secured to the trailing edge of the aerodynamic portion, an abrasion strip secured to the leading edge of the aerodynamic portion, and the tab and abrasion strip each having at least one slot therein to increase the flexibility of the blade.

32. A blade as in claim 1 for a rotor of a predetermined number of blades in which the blade has a natural frequency at operating revolutions per minute in the edgewise mode three type of vibration which is spaced from a frequency which equals the product of the number of blades and the speed of rotation of the rotor.

33. A blade as in claim 32 including the blade having a natural frequency of flatwise mode two type which is spaced from a frequency which is twice the rotor speed.

34. A blade as in claim 33 including the blade having a natural frequency in the higher mode types which are spaced from a frequency which is a multiple of rotor speed.

35. A rotor for self sustaining aircraft adapted to be rotated at approximately a predetermined speed for normal flight which constitutes an exciting frequency, comprising a universal joint having unrestricted and free floating movement, a shell carried by the universal joint, a casing rotatably mounted upon the shell, a plurality of blades, means mounting each blade upon the casing for rotating on its longitudinal axis and fixed thereto with respect to other directions of movement, each blade including an aerodynamic portion, a spar attached to the aerodynamic portion and projecting therefrom, the blades having a flexibility with natural frequencies in edgewise and flatwise modes at operating revolutions per minute, a drive shaft centrally of the rotor including a universal joint, gear reduction means connected between the universal joint and the casing, and the gear reduction means ratio being such that the universal joint speed differs from the natural frequencies of the blades in flatwise mode at rotor speed.

36. A rotor as in claim 35 in which the gear reduction means ratio is such that the universal joint speed differs from the natural frequency of the blades in flatwise mode 4 by a ratio of at least 1.3.

37. A blade for a self sustaining rotor having a universal joint which is adapted to be rotated at approximately a predetermined speed for normal flight which constitutes a universal joint exciting frequency comprising an aerodynamic portion, a spar attached at least to the inboard end of the aerodynamic portion and projecting therefrom, the blade having a flexibility in a plurality of natural frequencies in flatwise modes at operating speed, the natural frequencies differing from the universal joint exciting frequency, and the spar having an axial strength at least twice the maximum centrifugal force to which it is subjected in flight.

38. A blade as in claim 37 in which one of the natural blade frequencies at operating speed is a flatwise mode 4 frequency, which differs from the universal joint speed by a ratio of 1.3.

39. A blade for a rotor for rotorcraft to be mounted upon a fuselage with landing gear and adapted to be rotated at approximately a predetermined speed for normal flight which constitutes an exciting frequency comprising an aerodynamic portion, a spar attached at one end to the aerodynamic portion and projecting therefrom, the spar and aerodynamic portion being constructed with dimensions, mass and material to have a flexibility such that the ratio of exciting frequency in operating revolutions per minute to the natural edgewise mode two frequency of the blade at operating revolutions per minute is approximately 1.3 or greater whereby the natural resonance frequency of the blade in edgewise mode two is below the exciting frequency, the spar being the sole member for attaching the aerodynamic portion to a rotor, and the spar having an axial strength greater than the maximum centrifugal force to which it is subjected in flight.

40. A blade for a rotor for a rotorcraft to be mounted upon a fuselage with landing gear and adapted to be rotated at approximately a predetermined speed for normal flight which constitutes an exciting frequency comprising an aerodynamic portion, a spar attached at one end to the aerodynamic portion and projecting therefrom, the spar and aerodynamic portion being constructed with dimensions, mass and material to have a flexibility such that the natural frequency in secondary flatwise mode is spaced from multiples of the exciting frequency in operating revolutions per minute, the spar being the sole member for attaching the aerodynamic portion to a rotor, and the spar having an axial strength greater than the maximum centrifugal force to which it is subjected in flight.

41. A blade for a rotor for a rotorcraft to be mounted upon a fuselage with landing gear and adapted to be rotated at approximately a predetermined speed for normal flight which constitutes an exciting frequency comprising an aerodynamic portion, a spar attached at one end to the aerodynamic portion and projecting therefrom, the spar and aerodynamic portion being constructed with dimensions, mass and material to have a flexibility such that the ratio of exciting frequency of the blade at operating revolutions per minute to the natural edgewise mode two frequency at operating revolutions per minute is approximately 1.3 or greater whereby the natural resonance frequency of the blade in edgewise mode two is below the exciting frequency, the spar and aerodynamic portion being constructed such that the natural frequencies at operating revolutions per minute in higher flatwise modes are spaced from the pertinent exciting frequency and any multiple thereof at least ten percent for the tertiary modes and at least five percent for the higher modes, the spar being the sole member for attaching the aerodynamic portion to the rotor, and the spar having an axial strength greater than the maximum centrifugal force to which it is subjected in flight.

References Cited in the file of this patent

UNITED STATES PATENTS

| | | |
|---|---|---|
| 2,067,633 | Hafner | Jan. 12, 1937 |
| 2,068,617 | Wilford et al. | Jan. 19, 1937 |
| 2,144,428 | Martin | Jan. 17, 1939 |
| 2,648,387 | Doman | Aug. 11, 1953 |

FOREIGN PATENTS

| | | |
|---|---|---|
| 603,100 | France | Apr. 8, 1926 |
| 935,352 | France | June 17, 1948 |